United States Patent
Patton et al.

(10) Patent No.: US 10,644,945 B2
(45) Date of Patent: May 5, 2020

(54) CONTAINERIZED VIRTUAL NETWORK FUNCTION

(71) Applicant: HEWLETT PACKARD ENTERPRISE DEVELOPMENT LP, Houston, TX (US)

(72) Inventors: Burson Keith Patton, Plano, TX (US); Marc Cottington, Bracknell (GB); Xian Tan, Chongqing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 140 days.

(21) Appl. No.: 15/747,795

(22) PCT Filed: Aug. 20, 2015

(86) PCT No.: PCT/CN2015/087710
§ 371 (c)(1),
(2) Date: Jan. 26, 2018

(87) PCT Pub. No.: WO2017/028317
PCT Pub. Date: Feb. 23, 2017

(65) Prior Publication Data
US 2018/0227182 A1    Aug. 9, 2018

(51) Int. Cl.
*H04L 9/32* (2006.01)
*G06F 9/455* (2018.01)
*H04L 12/24* (2006.01)

(52) U.S. Cl.
CPC ...... *H04L 41/0843* (2013.01); *G06F 9/45558* (2013.01); *H04L 9/3228* (2013.01); *H04L 9/3263* (2013.01); *H04L 41/0806* (2013.01); *G06F 2009/45562* (2013.01); *G06F 2009/45587* (2013.01); *H04L 41/28* (2013.01)

(58) Field of Classification Search
CPC . H04L 41/0843; H04L 9/3263; H04L 9/3228; H04L 41/0806; H04L 41/28; G06F 9/45558; G06F 9/455
See application file for complete search history.

(56) References Cited

U.S. PATENT DOCUMENTS

| | | |
|---|---|---|
| 2011/0032944 A1 | 2/2011 | Elzur et al. |
| 2013/0124750 A1 | 5/2013 | Anumala et al. |
| 2014/0201374 A1* | 7/2014 | Ashwood-Smith ..... H04L 49/70 709/226 |

(Continued)

FOREIGN PATENT DOCUMENTS

| | | |
|---|---|---|
| CN | 104579732 A | 4/2015 |
| WO | WO-2014110453 A1 | 7/2014 |

OTHER PUBLICATIONS

"Docker overview", available online at <https://docs.docker.com/v18.03/engine/docker-overview/#control-groups>, 2018, 7 pages.

(Continued)

*Primary Examiner* — Aftab N. Khan
(74) *Attorney, Agent, or Firm* — Hewlett Packard Enterprise Patent Department (57) ABSTRACT

A container may include a containerized virtual network function and a container interface. The container interface may register the container with a host interface, receive a configuration from the host interface, and configure a VNF according to the configuration.

11 Claims, 5 Drawing Sheets

(56) References Cited

U.S. PATENT DOCUMENTS

| | | | | |
|---|---|---|---|---|
| 2014/0317261 A1* | 10/2014 | Shatzkamer | ............ | G06F 9/455 709/223 |
| 2016/0205518 A1* | 7/2016 | Patel | ........................ | H04L 67/16 455/518 |
| 2016/0212012 A1* | 7/2016 | Young | ..................... | H04L 41/14 |
| 2018/0123928 A1* | 5/2018 | Moradi | ................... | G06F 11/30 |

OTHER PUBLICATIONS

"HAProxy: The Reliable, High Performance TCP/HTTP Load Balancer", Version 1.8.0, available online at <https://web.archive.org/web/20180120060614/http://www.haproxy.org/>, Jan. 20, 2018, 15 pages.

"HPE VAN SDN Controller Software—Overview", available online at <https://support.hpe.com/hpsc/doc/public/display?docLocale=en_US&docId=emr_na-c03967699#top>, 2019, 4 pages.

"Linux containers: Infrastructure for container projects", available online at <https://web.archive.org/web/20180125034636/https://linuxcontainers.org/>, Jan. 25, 2018, 3 pages.

Adams et al., "Internet X.509 Public Key Infrastructure Certificate Management Protocol (CMP)", Network Working Group, Request for Comments: 4210, Obsoletes: 2510, Sep. 2005, 95 pages.

Kemp, "Kemp SDN Adaptive, powered by the HP VAN SDN Controller the changing nature of networks", available online at <https://web.archive.org/web/20160810001910/https://kemptechnologies.com/in/sdn-adaptive-load-balancing/>, Aug. 10, 2016, 3 pages.

Nourse et al., "Simple Certificate Enrollment Protocol", Internet Engineering Task Force, Internet-Draft, Sep. 7, 2011, 43 pages.

Schaad et al., "Certificate Management over CMS (CMC): Transport Protocols", Network Working Group, Request for Comments: 5273, Jun. 2008, 7 pages.

Schaad, j., "Internet X.509 Public Key Infrastructure Certificate Request Message Format (CRMF)", Network Working Group, Request for Comments: 4211, Obsoletes: 2511, Sep. 2005, 40 pages.

Advantech Co., Ltd., "Advantech Network Platforms, Blades & Adapters," Jun. 10, 2014, 1-page [online], Retrieved from the Internet on Feb. 26, 2015 at URL: <advantech.in/products/Network-Platforms-Blades-and-Adapters/sub_59E7896D-7F25-4F5D-8155-6B13F04B04EC/News/FEB7C6AD-751E-41E1-8FE7-5D3CC429A8A1/>.

International Search Report and Written Opinion, International Application No. PCT/CN2015/087710, dated May 18, 2016, pp. 1-6, SIPO.

Zynx Networks, Inc., "Znyx Announces High-density B1 Top-of-rack Switch Platform for Security and Nfv," Sep. 8, 2014, pp. 1-2 [online], Retrieved from the Internet on Feb. 26, 2015 at URL: <znyx.com/news/090814a.jsp>.

\* cited by examiner

CONTAINERIZED VIRTUAL NETWORK FUNCTION

BACKGROUND

Network function virtualization (NFV) uses the technologies of IT virtualization to virtualize entire classes of network node functions. Virtualized network functions (VNFs) are software implementations of network functions that can be deployed on a network function virtualization infrastructure (NFVI). A virtual network function (VNF) may comprise one or more virtual machines (VMs) running on top of industry standard equipment.

BRIEF DESCRIPTION OF THE DRAWINGS

Certain examples are described in the following detailed description and in reference to the drawings, in which.

DETAILED DESCRIPTION OF SPECIFIC EXAMPLES

Typical network functions (e.g. server load balancing (SLB), firewalling, etc.) in large-scale enterprise networks are generally provided on large vendor-proprietary devices. These may be complex to operate and manage, expensive to procure and maintain, and are typically underutilized. They also do not lend themselves to easy automation since, because they are proprietary appliance based, their Application Programming Interfaces (API's) are often vendor-specific, making them difficult to integrate into a high-level non-vendor-specific orchestration platform. Efforts to alleviate this complexity through Software Defined Networking (SDN)/OpenFlow (OF) techniques have led to only a partial fix, as the physical switch devices controlled via SDN/OF lack the intelligence to make decisions based on Open System Interconnection (OSI) Model layers 5-7, and so are not able to deliver the higher level services provided by SLBs and firewalls.

Implementations of the disclosed technology provide an NFV platform on network switches, such as Top-of-Rack (TOR) data center access switches. In some implementations, unused processing power of a ToR switch is used to execute a software containers containing a VNF. The VNF may be deployed on-demand using an SDN controller or other management system. Adding NFV and splitting these higher level functions amongst the large number of TOR switches present in a typical data center (DC) may be used to meet customer needs for network functions at lower costs. It may also reduce the growth of appliance sprawl, particularly in multi-tenant DCs, providing power, space and cooling savings for a more efficient and greener DC.

Figure 1:
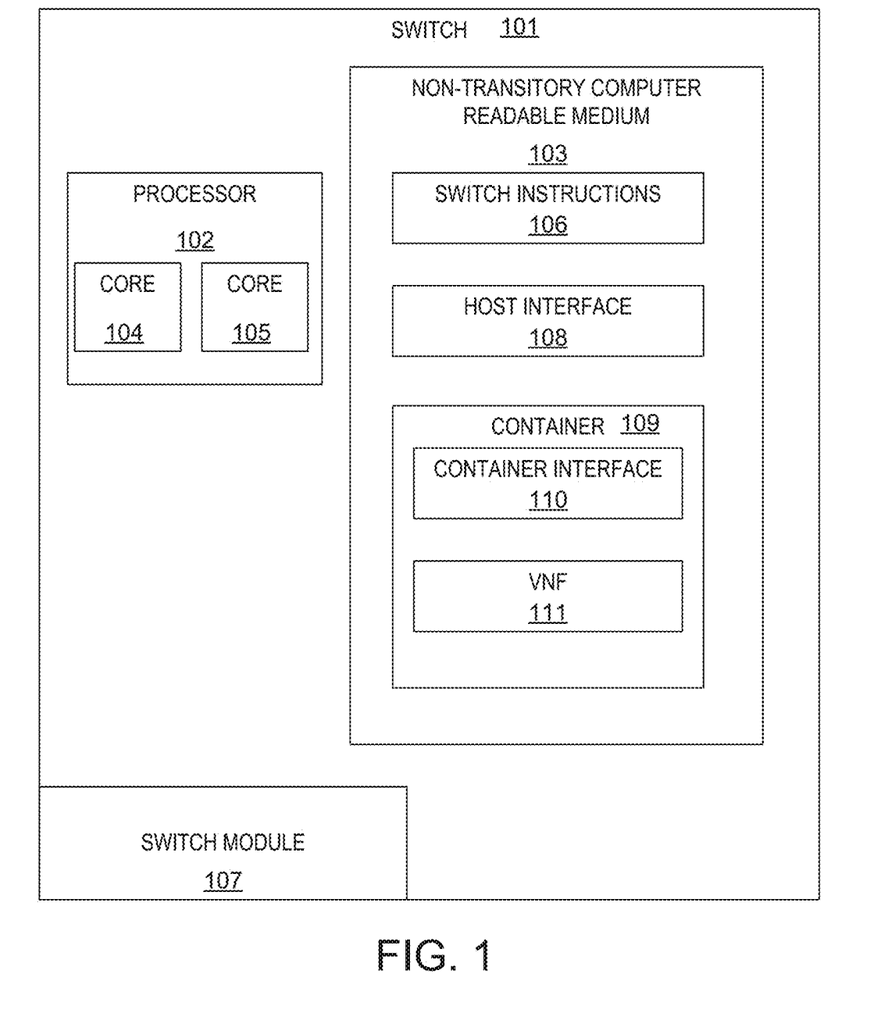
FIG. 1 illustrates an example network switch including a medium storing a set of switch instructions and containerized VNF instructions executable by a processor.

FIG. 1 illustrates an example network switch 101 including a medium 103 storing a set of switch instructions 106 and containerized VNF instructions 109 executable by a processor 102. For example, the network switch 101 may be a SDN compliant network switch, such as an OF compliant switch able to communicate via a management interface with an SDN controller. In some implementations, the network switch 101 may be a ToR switch, or other data center access switch, such as an end-of-row (EOR) switch.

The network switch 101 may include a processor 102. For example, the processor 102 may be a central processing unit (CPU) implementing an x86 instruction set architecture (ISA). In some implementations, the processor 102 may be a multi-core processor. For example, the processor 102 may have two or more processing cores 104, 105. The network switch 101 may further include a non-transitory computer readable medium 103. For example, the medium 103 may comprise random access memory (RAM), flash memory, solid state storage, or a combination thereof.

The medium 103 may store a first set of instructions 106 to control a switch data path of a switch module 107. The switch module 107 may include various hardware, firmware, and software to implement the switching functions of the switch 101. For example, the switch module 107 may include network ports, content addressable memory (CAM) such as ternary CAM (TCAM), and switch application-specific integrated circuits (ASICS). The instructions 106 may include a switch driver to enable the processor to interface with and configure the switch module 107. The instructions 106 may also include instructions such as instructions to implement the switch data path by executing a routing or bridging software suite or providing various tables, such as routing tables, bridge tables, or address resolution protocol (ARP) tables. In further implementations, the switch instructions 106 may include an operating system, such as Linux kernel. In some implementations, the processor 102 may execute all switch instructions 106 on a first core 104 of the processor. For example, the operating system may be configured to execute all switch instructions on the first core 104.

The medium 103 may further store a set of host interface instructions 108 executable by the processor to implement a host interface. The host interface may be an agent application running on the switch operating system. The host interface may provide an interface between a virtual machine container and a management system, such as an SDN controller. For example, the instructions 108 may include instructions to receive a configuration for a containerized virtual network function (VNF). For example, the configuration may be sent to the interface by an SDN controller via the SDN controller's REST API over a management communication link. In some implementations, the configuration may include a configuration file to be provided to the VNF. For example, the type of information contained in the configuration file may depend on the VNF to be implemented. For example, if the VNF is a load balancer, the configuration file may include timeout values, bindings, IDs, maximum connections, a load balancing policy, and other configuration details.

As another example, the configuration information may include an identification of whether the VNF will perform Secure Sockets Layer (SSL)/Transport Layer Security (TLS) offloading. In this example, the instructions 108 may be executable to obtain a one-time password for a digital certificate from the controller. For example, system may utilize Simple Certificate Exchange Protocol (SCEP) and the password may be a SCEP PIN. As another example, the system may utilize another certificate management protocol, such as RFC Certificate Management Protocol (CMP), and the password may be an appropriate token to retrieve a certificate according to the applicable protocol.

The host interface instructions 108 may further include instructions to instantiate a container including a container interface and the VNF. For example, the container may be a user-space instance containing the VNF and container interface executed though operating-system-level virtualization by the kernel of the switch operating system. In some cases, the instructions 108 may be executable to determine if an appropriate container is locally present. If not, the host interface may retrieve a template container containing a template VNF to instantiate the VNF in the container. For example, the instructions 108 may be executable to retrieve the template from a container repository. For example, container repository may store a catalog of template containers, with each template container corresponding to a different VNF.

The host interface instructions 108 may be executable to provide various other instantiation operations. For example, the instructions 108 may be executable to cause the kernel to boot the container, and to set up network connections for the container to use. For example, the host interface instructions 108 may be executable to instantiate the container with a management Ethernet interface having an IPv6 link local address. IPv6 addressing may be used to ensure that the internal switch management connectivity does not clash with the addressing used for the customer interfaces. Additionally, this may provide improved security, as the link local addressing will not be advertised and is not remotely accessible.

Additionally, the instructions 108 may be executable to run the container with appropriate IP/VLAN assignments to implement the VNF. For example, for a load balancer VNF, the instructions 108 may be executable to set up an external wide area network (WAN) facing network interface, a network interface facing the rack servers being balanced, and the management interface facing the host interface for the internal management link.

The medium 103 may further store a set of container instructions 109. For example, the container instructions 109 may be introduced into the medium by the host interface 108 as described above. In some implementations, the container instructions 109 may be executable on a different core than the switch instructions 106. For example, the container template from which the container is instantiated may include configuration settings causing the switch kernel to execute the container on a different core than the switch instructions 106. For example, if the switch instructions 106 are executed on a first core 104, the container may be executed on a second core 105. In greater than dual core systems, such as 4 or 8 core systems, the switch instructions 106 may be executed on a single core, and the container instructions may be executed on the remaining cores.

The container instructions 109 may include a set of container interface instructions 110 executable by the processor 102 to implement a container interface. The container interface may serve as an interface between the host interface and the VNF. For example, the container interface may communicate with the host interface on the TOR switch to pass configuration details to the VNF, to start and stop the VNF as required, and to pass management information back to the host interface. Additionally, in some implementations, the container interface may perform VNF monitoring functions. For example, the container interface may respond to queries from the host interface regarding the status of the VNF application.

The container interface instructions 110 may be executable to register the container with the host interface. For example, these instructions may be executable prior to starting VNF operations during the VNF configuration process. For example, the container interface may send a registration request to the host interface of the local management link. In some cases, this registration request may include the container's IPv6 link local address. In these cases, the host interface instructions 108 may be executable to obtain the IPv6 link local address. For example, the address may be obtained from the registration request.

The container interface instructions 110 may be further executable to receive the configuration from the host interface. For example, the container interface may receive the configuration from the host interface over the local management link in response to the registration request. As described above, the configuration may include a configuration file for the VNF.

Additionally, the configuration may include information specifying whether certain services or functions should be activated. For example, the configuration may specify whether the VNF will be performing TSL/SSL offloading. In these cases, the container interface instructions 110 may be executable to obtain a one-time password for a digital certificate from the host interface. For example, the password may be a SCEP PIN. The instructions 110 may be further executable to use the password to retrieve the digital certificate from a certificate server. For example, the container interface may retrieve the certificate from the certificate server according to SCEP. Additionally, the instructions 110 may be executable to refresh the certificate after obtaining it to ensure that the certificate is valid and not expired.

The container interface instructions 110 may be further executable to register a Domain Name System (DNS) address with a DNS server. For example, the instructions 110 may be executable to register the DNS address using dynamic DNS update protocol for future certificate usage.

The container interface instructions 110 may be further executable to configure the VNF according to the configuration. For example, the container interface may pass the configuration file to the VNF. Additionally, if a certificate will be utilized by the VNF, the container interface may install the certificate. The container interface instructions 110 may be further executable to start the VNF. After starting the VNF, the container interface may inform the host interface that the VNF has started and is available for use.

The container instructions 109 may further include a set of VNF instructions 111 executable by the processor 102 to implement the VNF. For example, the VNF may comprise any virtual network function, such as a load balancer, firewall, an application level firewall, a usage monitor, an intrusion detection application, or a WAN optimization application.

In some implementations, the host interface instructions 108 and container interface instructions 110 may be executable to reconfigure the VNF. In some cases, the host interface instructions 108 may be executable to receive a second configuration for the VNF and to provide the second configuration to the container interface. For example, the host interface may receive the second configuration as an updated configuration file for the VNF and may provide the second configuration to the container interface via the local management link.

In these cases, the container interface instructions 110 may be executable to stop the VNF, configure the VNF according to the second configuration, and start the VNF. For example, the instructions 110 may be executable to reload the VNF application using the new configuration file and then restart the VNF.

In some implementations, the switch 101 may execute a plurality of VNFs 111 in a plurality of containers 109. As an example, in a multicore system, the switch 101 may execute each container on a separate core. For example, in a four core system, the switch may execute up to three containers on the three cores not used for switch instructions 106. As another example, multiple containers 109 may be executed on a single core of the processor 102. For example, the switch instructions 106 may be executed on a first core 105 and multiple containers 109 may be executed on a second core 105.

In some cases, the host interface instructions 108 may be executable by the processor 102 to receive a second configuration for a second containerized virtualized VNF. For example, the instructions 106 may be executable to cause the host interface to receive the configuration from an SDN controller via the SDN controller's REST API.

In these cases, the host interface instructions 108 may be further executable to retrieve a template container. For example, the instructions 108 may be executable to retrieve the template container from a template repository if the second configuration is for a VNF different than an existing VNF 111 on the switch. The template container may be similar to template container used to instantiate the existing container 109. For example the template container may contain a second set of container interface instructions 110 and a second template VNF to implement a second VNF 111. However, second set of container interface instructions 110 and second template VNF may be specific to the new VNF 111 to be instantiated.

In these cases, the host interface instructions 108 may be further executable to use the template container to instantiate the second container. For example, the instructions 108 may be executable to boot the second container and set up appropriate network interfaces for the second VNF 111. The instructions 108 may be further executable to provide the second configuration to the second container interface. For example, the second configuration may be provided during a registration process between the second container interface and the host interface.

Figure 2:
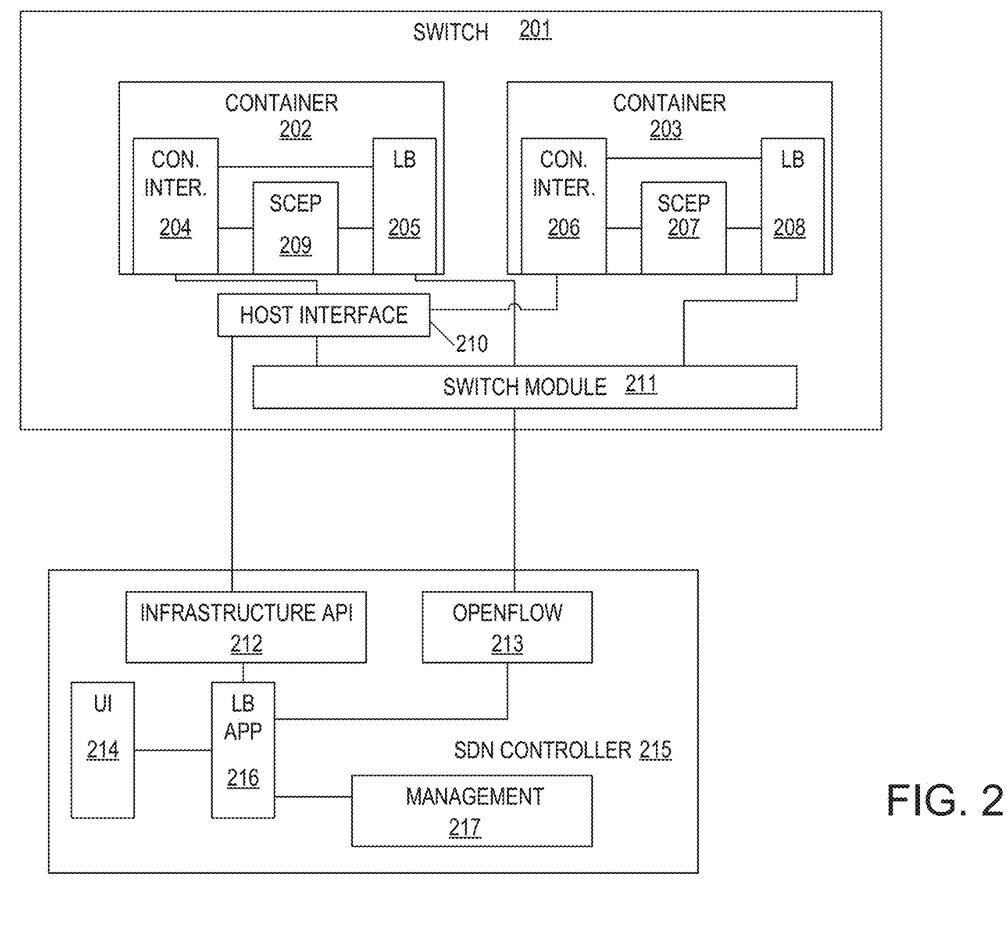
FIG. 2 illustrates an example system architecture including a network switch and an SDN controller.

FIG. 2 illustrates an example system architecture including a network switch 201 and an SDN controller 215. For example, the network switch may be a TOR switch implemented as described with respect to FIG. 1. In this particular example, the switch 201 implemented a pair of containerized load balancers 205, 208.

The switch 201 may include a switch module 211, which may include the switch hardware, such as network ports, CAM, and ASICs, and the switch software stored on a non-transitory computer readable medium and executed by a processor. For example, the switch software may include a switch operating system kernel, various tables, and software programs to implement the switch data path. As described above, the switch software may be executed on a single core of a multi-core processor, such as an x86 multi-core processor. The SDN controller 215 may send OF rules to the switch module 211 to program the switch's data path. For example, the SDN controller 215 may transmit the OF rules over an out-of-band network connection for system management.

The switch 201 may further include a host interface 210. The host interface 210 may serve as a management interface between the containers 202, 203, the switch module 211 and the SDN controller 215. For example, the SDN controller 215 may include a REST API to communicate with the host interface 210. The host interface 210 may implement its own REST API to communicate with the containers 202, 203. Additionally, the host interface 210 may communicate with the switch module 211 to set up network connections for the containers 202, 203. Additionally, as described above, the host interface 210 may be connected to a container repository to retrieve container templates to instantiate the containers 202, 203.

The SDN controller 215 may include a VNF controller application 216. For example, the VNF controller application 216 may operate based on instructions received from a user interface 214 or from instructions received over a management interface 217 from an NFV orchestration system, or cloud infrastructure management system. For example, the management interface 217 or user interface 214 may be used to cause the controller 216 to initiate the host interface 210 loading the containers 202, 203 onto the switch 201. Additionally, the application 216 may generate or receive the configuration for the containers 202, 203 and provide the configurations to the host interface 210. For example, the configuration may include a configuration file, a container ID number, load balancer DNS name for the load balancer to be created, and, if applicable, a one-time password for a certificate.

Additionally, the controller 216 may obtain a confirmation message once the VNF is ready to use, and may notify a user using the user interface 214 or notify the cloud management system through the management interface 217.

In some implementations, the host interfaces 210 of each switch 201 may provide various measurement information to the controller 216. The controller 216 may use information regarding the network to perform a lookup to select on which TOR switch 201 to install the load balancers. For example, the controller 216 may select a suitable TOR switch 201 that is in proximity to the servers to be used in the load balancing farm. Additionally, the controller 216 may take into account unused processing resources available on prospective switches 201. In some implementations, a cloud management system may collect this information and perform this selection using the interface 217.

The switch 201 may further include a pair of containers 202, 203 executing load balancer VNFs 205, 208. Each container 202, 203 may include a container interface 204, 206 and load balancer applications 205, 208. Additionally, if the VNFs are to perform TSL/SSL offloading, the containers 202, 203 may include certificate clients 209, 207. For example, the clients 209, 207 may be SCEP clients.

Figure 3:
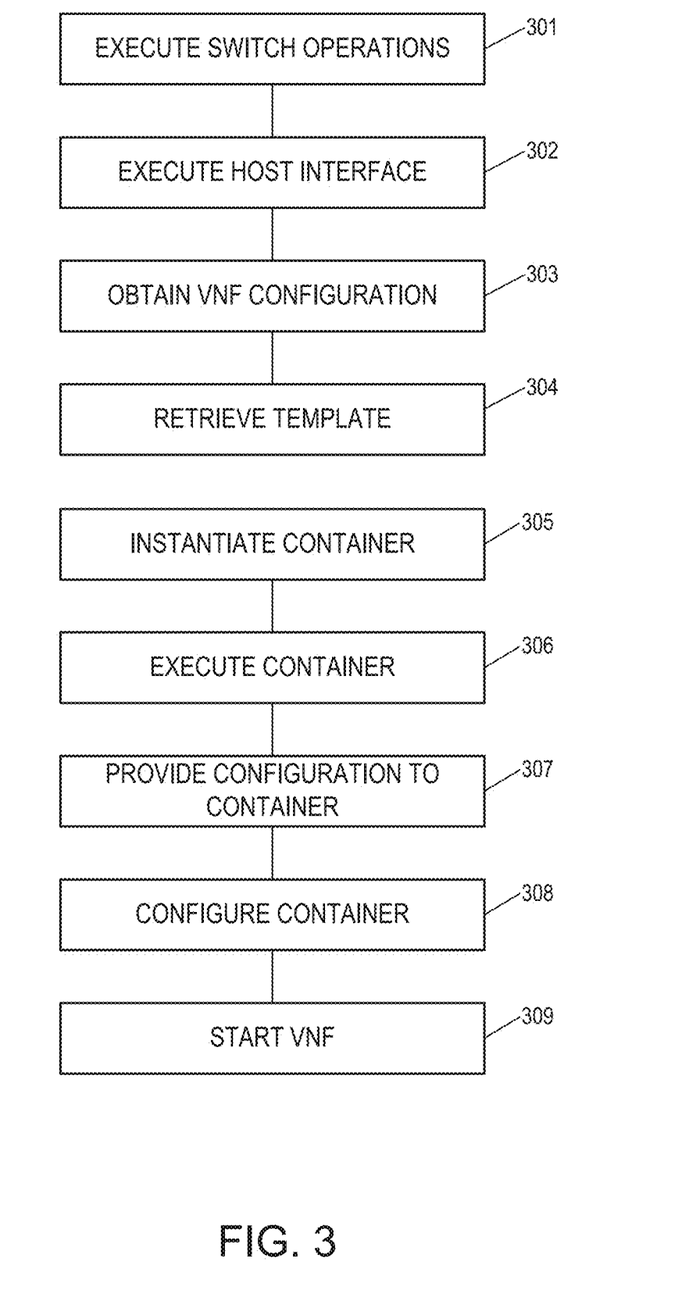
FIG. 3 illustrates an example method of operation of a switch executing a set of switch operations on a first core of a processor and a container on a second core of the processor.

FIG. 3 illustrates an example method of operation of a switch executing a set of switch operations on a first core of a processor and a container on a second core of the processor. For example, the example method may be performed by an implementation of a switch 101 or a switch 201 as described with respect to FIG. 1 or 2, respectively.

The method may include block 301. Block 301 may include a switch operating system executing a set of switch operations on a first core of a switch processor. For example, the switch operating system may execute instructions to implement a data path, such as instructions 106 of FIG. 1. As another example, the switch operating system may maintain tables, such as routing tables, bridge tables, OF rule tables, ARP tables, and execute switch drivers, routing suites, or other switch operational software.

The method may further include block 302. Block 302 may include the switch operating system executing a host interface. For example, block 302 may be performed as described with respect to execution of instructions 108 of FIG. 1 or as described with respect to the operation of host interface 210 of FIG. 2.

The method may further include block 303. Block 303 may include the host interface obtaining a configuration for a VNF. For example, block 303 may include the host interface receiving an instruction to instantiate a particular VNF including an identification number (ID) for the container to be instantiated, a DNS name for the VNF, a configuration file for the VNF, and a password for a certificate.

The method may further include block 304. Block 304 may include the host interface retrieving a template container for the VNF. For example, block 304 may include the host interface executing a startup script to determine if a previous container having the ID has been instantiated on the switch. If not, then the host interface may retrieve the template container for the VNF from a template repository. For example, the repository may comprise a catalog of template containers organized by VNF type. Each template may include a container interface program as well as the corresponding VNF application.

The method may further include block 305. Block 305 may include the host interface instantiating a container for the VNF. For example, the host interface may instantiate the container by installing the template container and setting up the template container on the switch. For example, block 305 may include booting the container and setting the container up with various network interfaces. The network interface may include a management Ethernet interface and interfaces necessary to implement the VNF. For example, for a load balancer, the interfaces may include a WAN-facing interface and a server rack-facing interface. Additionally, block 305 may include assigning appropriate IP & VLAN assignments. For example, these assignments may be provided to the interface by a controller in the configuration information. Upon instantiating the container, the container interface included in the container may start.

The method may further include block 306. Block 306 may include the switch operating system executing the container on a second core of the switch processor. For example, block 306 may include the operating system executing the software contained within the container in a separate user-space unique to the container through an operating system level virtualization protocol. In some cases, the container may include configuration data causing the operating system to operate the container on a separate core than the switch operations.

The method may further include block 307. Block 307 may include the host interface providing the configuration to the container interface. For example, block 307 may include the container interface registering with the host interface using the management Ethernet interface. Upon registering, the host interface may obtain the container's link local address for its management port, and the container interface may obtain the configuration.

The example method may further include block 308. Block 308 may include the container interface configuring the VNF according to the configuration. For example, block 308 may include the container interface registering its DNS address using dynamic DNS update protocol. If the configuration information included a one-time password for a certificate, then block 308 may include the container interface using the one-time password to obtain the certificate from a certificate server. Block 308 may further include the container interface refreshing the certificate and installing the certificate in an ancillary client on the container.

The example method may further include block 309. Block 309 may include the container interface starting the VNF. For example, block 309 may include the container interface executing a VNF startup command, and passing the configuration file to the VNF at startup. Additionally, block 309 may include the container interface notifying the host interface that the VNF has started and is ready for use.

Figure 4:
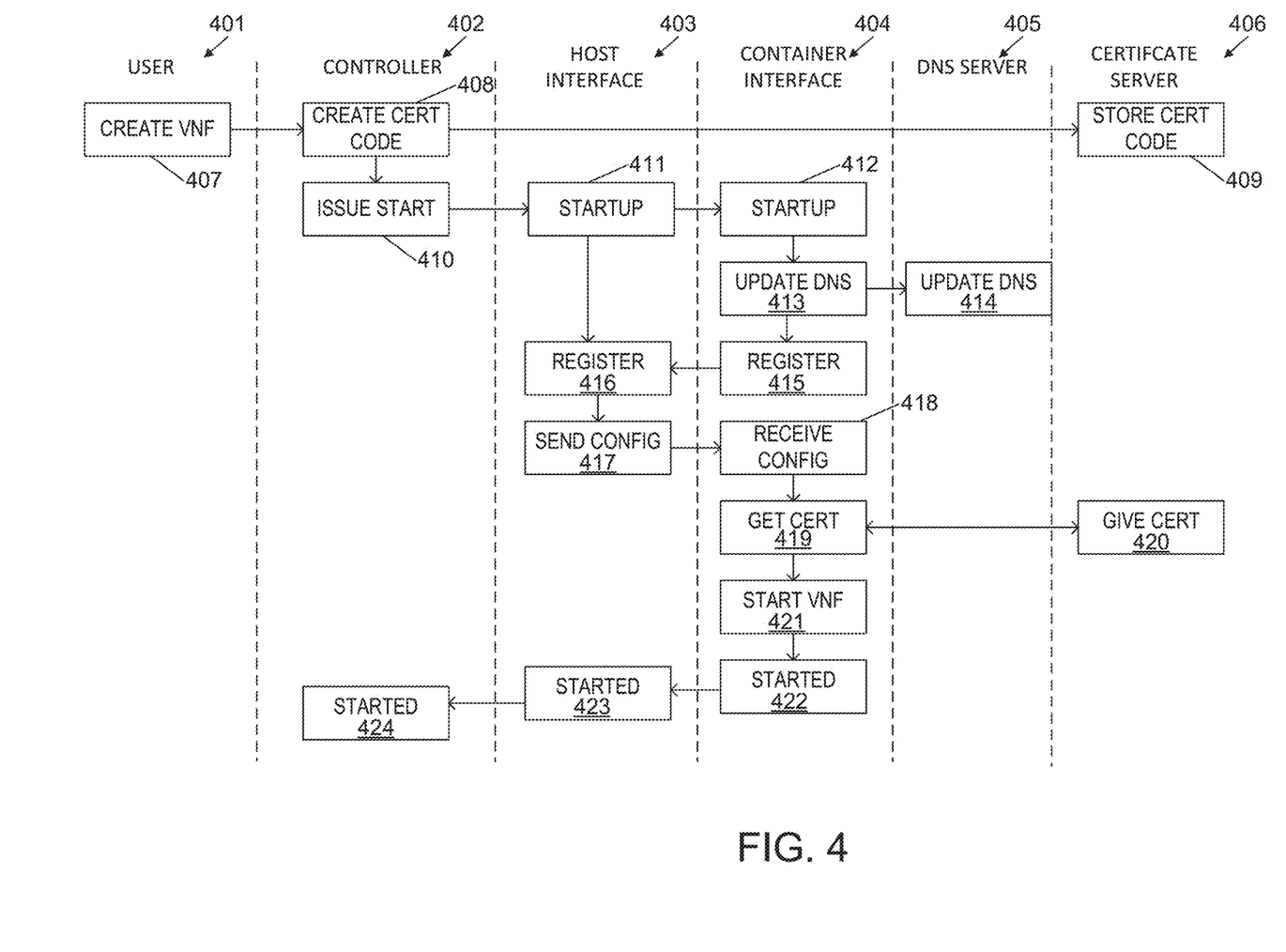
FIG. 4 illustrates an example of system operation include steps performed by a user, controller, host interface, container interface, DNS server, and certificate server.

FIG. 4 illustrates an example of system operation include steps performed by a user 401, controller 402, host interface 403, container interface 404, DNS server 405, and certificate server 406. For example, the illustrated method may be performed by a system such as the network switch and controller of FIG. 2.

The method may include block 407, performed by a user. In block 407 the user may request a VNF be created via a user interface. For example, a VNF controller application running on an SDN controller, such as application 216 of FIG. 2, may have a user interface 214, that allows the user to perform block 407. During block 407, the user may pass various information such as a DNS name for the VNF. For example, to implement a load balancer, the user may additionally pass an IP address and port for the server farm.

If a certificate will be needed by the VNF, for example for SSL/TLS offloading, then block 408 may be performed. In block 408, the SDN controller 402 creates a one-time password for the VNF. For example, the SDN controller 402 may create a SECP PIN. In block 409, the password is stored in the certificate server 406. For example, block 407 and 409 may be performed by the VNF application on the controller 402 requesting a certificate/PIN combination from a local certificate authority (CA) based on the DNS name input by the user.

The method may include block 410. In block 410, the controller application may determine an appropriate switch for the VNF. For example, for a load balancer, the controller application may perform a lookup to determine a suitable TOR switch that is in proximity to the servers in the load balancing farm. Block 410 may further include the controller application instructing a host interface on the chosen host device to dynamically create the VNF. For example, block 410 may be implemented utilizing an SDN controller's REST interface. Various information may be provided to the host interface based on the VNF to be implemented. For example, the controller application may send configuration information such as a configuration file, a container ID, the VNF's DNS name, and, if utilized, the password for the certificate.

The method may further include block 411. Block 411 may include the host interface 403 receiving the information from the controller 402 and calling a startup script to start the container. For example, the host interface 403 may check to see if the container required is local resident. If not, the host interface 403 may pull an appropriate template container image from a container repository. Block 411 may further include the host interface 403 setting up the network connections for the container to use by running the container with appropriate IP/VLAN assignments. For example, the network connections may include a management connection with an IPv6 address, and customer data interfaces. After initializing the container, the host interface may wait for the container to become active, indicated by receiving a registration request from the container interface 404.

The method may further include block 412. In block 412, the container starts up by first executing the container interface 404. For example, the container interface 404 may first capture the container's IPv6 link local address to be used for its management port.

The method may further include blocks 413 and 414. In blocks 413 and 414, the container interface 404 may register its DNS address with a DNS server 405 using a dynamic DNS update protocol. In some implementations, this is necessary for certificate usage, and can be omitted if a certificate is not needed.

The method may further include blocks 415 and 416 for the container interface 404 to register with the host interface 403. In block 415, the container interface may register with the host interface 403, including sending the host interface 403 the container ID. The registration may take place by the container interface 404 calling back to the host interface 403 on its underlying TOR switch so that the host interface 403 has the IPv6 management address of the container for ongoing communication. In block 416, the host interface 403 may store the IPv6 management address associated with the container ID.

The method may further include blocks 417 and 418, which may complete the registration process. In block 417, the host interface 403 sends configuration information to the container interface 404 over the management connection. For example, for a load balancer, the configuration information may include a load balancer configuration file. In block 418, the container interface 404 receives the configuration information and saves it to an appropriate location. For example, block 418 may include installing the configuration information into the VNF.

The method may include block 419 and 420. If the container interface 404 is told that it needs a certificate in blocks 411-417, then the container may retrieve its password and use it to retrieve a certificate from the certificate server 406. For example, the container interface 404 and certificate server 406 may perform blocks 419 and 420 according to SCEP or CMP. Additionally, the container interface may refresh the initial certificate to ensure the certificate is not expired. Block 419 may further include the interface 404 installing the certificate The method may further include block 421. In block 421, the container interface 404 starts the VNF. For example, block 421 may include starting a load balancer application. In some implementations, the container interface 404 may have the ability to start and stop the VNF, and reload new configurations. Additionally, the interface 404 may respond to status queries regarding the VNF from the host interface 403.

The method may further include blocks 422-424. In block 422, the container interface 404 informs the host interface that the VNF is started and available for use. If there are any startup errors, block 422 may include passing error codes to the host interface 403. In block 423, the host interface may pass a message to the controller 402 that the VNF has started. This message may include the container ID and any error codes. In block 424, the controller 402 returns an indication that the VNF has started, along with any information such as the container ID or error codes requested by the user.

Figure 5:
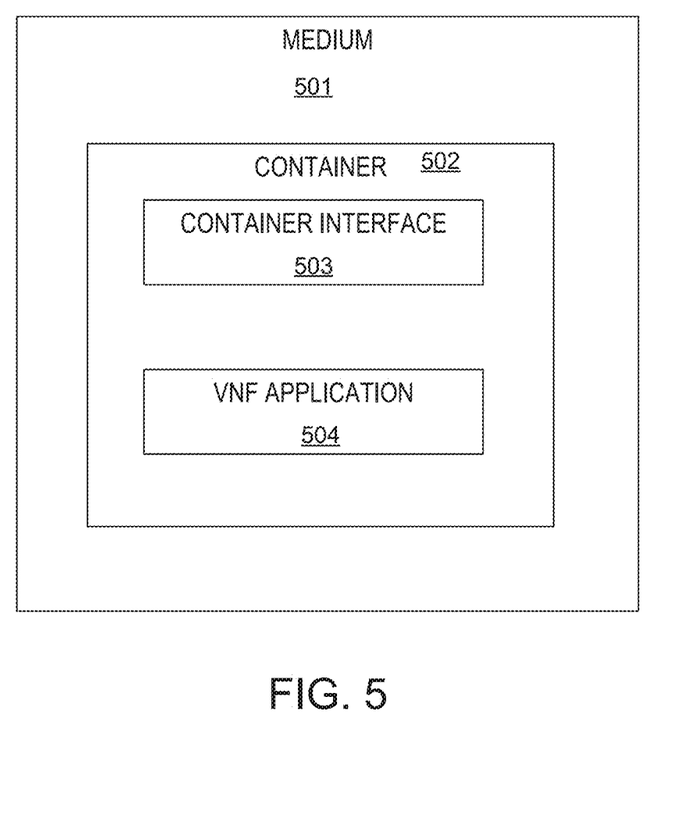
FIG. 5 illustrates an example non-transitory computer readable medium storing a container.

FIG. 5 illustrates an example non-transitory computer readable medium 501 storing a container 502. For example, the medium 501 may be located at a container repository, and the container 502 may be a template container image. As another example, the medium 501 may be located at a switch, such as a TOR switch, and the container may be an installed container executed by a switch operating system.

The container may include a containerized virtual network function application 504 and a set of container interface instructions 503.

The container interface instructions 503 may include instructions to detect a management Ethernet interface and a link local address. For example, the management Ethernet interface and link local address may be set up during installation of the container on a switch by a host interface.

The instructions 503 may further include instructions to register with a host interface by sending a container identification and the link local address to the host interface. These instructions 503 may be further executable to receive a configuration file from the host interface and configure the VNF application according to the configuration file. The instructions 503 may be further executable to start the VNF application.

In some implementations, the instructions 503 may be executable to register a Domain Name System (DNS) address with a DNS server. For example, the container interface may register with the DNS server prior to obtaining a certificate.

In some cases, the instructions 503 may be further executable to receive a password for a certificate from the host interface. The instructions 503 may also be executable to use the password to obtain the certificate from a certificate server, refresh the certificate, and install the certificate in the container 502.

In some implementations, the instructions 503 may be further executable to perform VNF monitoring functions. For example, the instructions 503 may be executable to receive a status query from the host interface and respond with a current status of the VNF application.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A network switch, comprising:
   a processor;
   a non-transitory computer readable medium, storing:
      a set of switch instructions executable by the processor to control a switch data path;
      a set of host interface instructions executable by the processor implement a host interface to:
         receive a configuration for a containerized virtual network function (VNF);
         instantiate a container including a container interface and the virtual network function (VNF); and
         provide the configuration to the container interface; and
      a set of container instructions executable by the processor to implement the container, the container instructions including:
         a set of container interface instructions executable by the processor to implement the container interface to:
            register the container with the host interface;
            receive the configuration from the host interface;
            configure the VNF according to the configuration; and
            start the VNF; and
         a set of VNF instructions to implement the VNF;
         wherein the container interface instructions are executable to:

obtain a one-time password for a digital certificate from the host interface;
register a Domain Name System (DNS) address with a DNS server; and
use the one-time password to retrieve the digital certificate from a certificate server.

2. The network switch of claim 1, wherein the switch instructions are executable by the processor on a first core and the container instructions are executable by the processor on a second core.

3. The network switch of claim 1, wherein the host interface instructions are executable by the processor to retrieve a template container containing a template VNF to instantiate the VNF in the container.

4. The network switch of claim 1, wherein:
the host interface instructions are executable to receive a second configuration and to provide the second configuration to the container interface; and
the container interface instructions are executable to stop the VNF, configure the VNF according to the second configuration, and start the VNF.

5. The network switch of claim 1, wherein the host interface instructions are executable by the processor to:
receive a second configuration for a second containerized virtualized VNF;
retrieve a template container containing a second set of container interface instructions to implement a second container interface, and a second template VNF;
use the template container to instantiate the second container; and
provide the second configuration to the second container interface.

6. The network switch of claim 1, wherein the host interface instructions are executable by the processor to instantiate the container with a management Ethernet interface having an IPv6 link local address.

7. The network switch of claim 6, wherein:
the container interface instructions are executable to register with the host interface via the management Ethernet interface;
the host interface instructions are executable to obtain the IPv6 link local address.

8. A method; comprising:
a switch operating system executing a set of switch operations on a first core of a switch processor;
the switch operating system executing a host interface;
the host interface obtaining a configuration for a virtual network function (VNF);
the host interface retrieving a template container for the VNF;
the host interface instantiating a container for the VNF, the container including a container interface and a management Ethernet interface;
the switch operating system executing the container on a second core of the switch processor;
the host interface providing the configuration to the container interface;
the container interface configuring the VNF according to the configuration;
the container interface registering with the host interface using the management Ethernet interface;
the container interface starting the VNF;
the host interface receiving a one-time password for a certificate;
the host interface providing the one-time password to the container interface over the management Ethernet interface; and
the container interface using the one-time password to obtain the certificate from a certificate server.

9. A non-transitory computer readable medium storing:
a container including a containerized virtual network function (VNF) application and container interface instructions to:
detect a management Ethernet interface and a link local address;
register with a host interface by sending a container identification and the link local address to the host interface;
receive a configuration file from the host interface;
configure the VNF application according to the configuration file; and
start the VNF application;
wherein the container interface instructions are to:
receive a password for a certificate from the host interface:
use the password to obtain the certificate from a certificate server;
refresh the certificate; and
install the certificate in the container.

10. The non-transitory computer readable medium of claim 9, wherein the container interface instructions are to:
register a Domain Name System (DNS) address with a DNS server.

11. The non-transitory computer readable medium of claim 9, wherein the container interface instructions are to:
receive a status query from the host interface; and
respond with a current status of the VNF application to the host interface.

* * * * *